US006912017B1

(12) United States Patent
Minami et al.

(10) Patent No.: US 6,912,017 B1
(45) Date of Patent: Jun. 28, 2005

(54) DISPLAY DEVICE FOR DISPLAYING DIGITAL INPUT IMAGE DATA USING DIFFERENT FILTER SEGMENTS FOR THE LOWER AND HIGHER ORDER BITS

(75) Inventors: Koji Minami, Tokyo (JP); Yoshiteru Suzuki, Tokyo (JP); Kohei Teramoto, Tokyo (JP); Hiroaki Sugiura, Tokyo (JP); Shinsuke Shikama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/887,665

(22) Filed: Jan. 12, 2000

(30) Foreign Application Priority Data

Mar. 24, 1999 (JP) .......................................... 11-079518

(51) Int. Cl.[7] ............................ H04N 9/12; H04N 5/64

(52) U.S. Cl. ....................... 348/743; 348/655; 348/658; 348/742; 348/744; 348/750; 348/771; 348/835

(58) Field of Search ............................ 348/68–70, 655, 348/658, 742–744, 750, 754, 758–759, 771, 835, 615–617; 345/48, 88–90, 690; H04N 9/12, 5/64

(56) References Cited

U.S. PATENT DOCUMENTS

| | | | | | |
|---|---|---|---|---|---|
| 5,233,385 | A | | 8/1993 | Sampsell | |
| 5,737,038 | A | * | 4/1998 | Gale et al. | 345/84 |
| 5,812,303 | A | * | 9/1998 | Hewlett et al. | 359/298 |
| 6,054,832 | A | * | 4/2000 | Kunzman et al. | 318/599 |
| 6,108,053 | A | * | 8/2000 | Pettitt et al. | 348/180 |
| 6,226,054 | B1 | * | 5/2001 | Morgan et al. | 345/589 |
| 6,243,072 | B1 | * | 6/2001 | McKnight | 345/600 |
| 6,256,425 | B1 | * | 7/2001 | Kunzman | 348/742 |
| 6,324,006 | B1 | * | 11/2001 | Morgan | 348/742 |
| 6,388,648 | B1 | * | 5/2002 | Clifton et al. | 345/88 |
| 6,392,656 | B1 | * | 5/2002 | Someya et al. | 345/589 |
| 6,392,717 | B1 | * | 5/2002 | Kunzman | 348/655 |
| 6,445,505 | B1 | * | 9/2002 | Morgan | 359/618 |
| 6,674,489 | B1 | * | 1/2004 | Kagawa et al. | 348/743 |
| 2002/0030641 | A1 | * | 3/2002 | Minami et al. | 345/48 |

FOREIGN PATENT DOCUMENTS

JP A9-149350 6/1997

* cited by examiner

*Primary Examiner*—Brian P. Yenke
(74) *Attorney, Agent, or Firm*—Birch, Stewart, Kolasch & Birch, LLP

(57) ABSTRACT

There is disclosed a display device using a color wheel having a color filter Cw, in addition to normal color filters corresponding to the three primary colors. The filter Cw has almost flat spectral transmission characteristics. Brightness information included in a color image signal is quantized with (n+m) bits. Information corresponding to the lower-order n bits is displayed by light transmitted through the filter Cw. Information corresponding to the upper-order n bits is displayed by light transmitted through the normal color filters. Only brightness information to which the human eye is visually sensitive is reproduced by the filter Cw having a lower transmissivity. This can eliminate a lack of the number of gray levels due to a constraint on the minimum switching speed of a light valve. Furthermore, the brightness little deteriorates.

10 Claims, 6 Drawing Sheets

DISPLAY DEVICE FOR DISPLAYING DIGITAL INPUT IMAGE DATA USING DIFFERENT FILTER SEGMENTS FOR THE LOWER AND HIGHER ORDER BITS

BACKGROUND OF THE INVENTION

1. Field of the Invention

The present invention relates to a display device and, more particularly, to a display device using color filters to reproduce colors.

2. Description of the Prior Art

In recent years, numerous display devices have been available in which color filters are used to decompose light from a light source into N colors that are projected onto a screen for reproducing a color image, where N is a positive integer. Normally, N=3, and light is decomposed into red (R), green (G), and blue (B) colors which are projected to reproduce a color image. The simplest example of implementation for achieving this is given below.

FIG. 1 shows an example of a display device, comprising a light source 101, a color wheel 102, a light valve 103, a screen 104, and drive electronics 105. The display device shown in FIG. 1 is assumed to project light decomposed into R, G, and B colors, thus reproducing color images.

The operation of the display device constructed as described above is described by referring to FIG. 1. Seven-bit color image data having a frame rate of 60 Hz and a synchronizing signal are applied to the drive electronics 105. The drive electronics 105 create control signals for the color wheel 102 and for the light valve 103 from the entered color image data and the synchronizing signal. The control signals are fed to the color wheel 102 and to the light valve 103.

The light valve 103 is a device for turning ON or OFF each individual pixel. A digital micromirror device (DMD), a liquid crystal, or the like is used as the light valve 103. Where the DMD is used as the light valve 103, the direction in which light is reflected is controlled for each individual pixel, thus turning ON or OFF the light. Where the light is reflected toward the screen, the device is turned ON. Where the light is reflected toward the outside the screen, the device is turned OFF. This is referred to as control of the reflection.

Where a liquid crystal is used as the light valve 103, the following two types are conceivable. One type controls reflection in the same way as the aforementioned DMD. Another type switches ON and OFF passage of light for each individual pixel. Where the light is transmitted, the device is turned ON. Where the light is not transmitted, the device is turned OFF. The transmitted light is brought to a focus on the screen.

An ultrahigh-pressure mercury lamp is used as the light source 101, for example. Light emitted from this lamp is made to hit a part of the color wheel 102. This color wheel 102 is divided into three segments, for example. These segments are color filters Cr, Cg, and Cb that transmit R, G, and B, respectively. The color wheel 102 makes one revolution in 1/60msec, i.e., about 16.667 msec (3600 rpm). This rotation is synchronized to the frame rate (60 Hz in the above example) of the displayed image.

Where light from the light source 101 shines on the color filter segment Cr on the color wheel 102, the light valve 103 is controlled by color image data about R. An R image is projected onto the screen 104. With other colors, the light from the light source 101 is similarly projected onto the screen 104 via the color filters on the color wheel 102 and via the light valve 103, and images are displayed.

The times for which the light from the light source 101 is made to shine on the segments of the color wheel 102 during one revolution of the color wheel 102 are next described. The light source 101 illuminates parts of the color wheel 102. The produced light spot has some diameter. Where this light spot is at the boundary between two adjacent color filters, two colors across the boundary will be mixed up. That is, one light spot has two colors of light transmitted through the color filters. This cannot be used for image display. Therefore, where the light spot shines on the boundary, it is necessary to turn OFF the light valve.

For the sake of illustration, it is assumed that the light valve must be kept OFF within an angular range of 15° on the color wheel 102. Of course, this angular range may differ, depending on the size of the light spot and on the sizes of the segments forming the color filters.

As can be seen from FIG. 1, the boundaries between the color filters on the color wheel 102 are three boundaries between R, G, and B colors. During one revolution of the color wheel 102, it is necessary to turn OFF the light valve 103 for a time corresponding to an angular range of $15\times3=45°$. This time is referred to as the ineffective time. The other time is referred to as the effective time.

Since the color wheel 102 makes one revolution in about 16.667 msec, the ineffective time is $45°/360°\times16.667\cong$approximately 2.083 msec. Of the effective time, the time for which the light shines on the color filter Cr is equal to the effective time divided by 3, i.e., about 4.862 msec $((1/60\times(1-45°/360°))/3\cong16.667-2.083)$ msec/three colors. Similarly, the time for which the light shines on the color filters Cg and Cb is about 4.862 msec.

A method of reproducing gray levels is now described by taking the case of R as an example. When the light shines on the color filter Cr during the effective time of the color wheel 102, the light valve 103 is controlled according to an R image signal. Where the first gray level is displayed, the light valve 103 is turned ON for about 0.038 msec within the time for which the light shines on the color filter Cr during one revolution of the color wheel 102. The light valve is kept OFF during the remaining time of about 4.824 msec. Where the second gray level is displayed, the light valve 103 is turned ON for twice of the ON time for the first gray level, i.e., 0.076 msec. The light valve is kept OFF during the remaining time of 4.786 msec. Where the third, fourth, . . . , and 127th gray levels are displayed, the light valve is turned ON for 3 times, 4 times, . . . , and 127 times, respectively, of the ON time for the first gray level. The light valve is kept OFF during the remaining times. Thus, there are 128 combinations of ON/OFF times including a fully OFF state.

The human eye does not respond to flickers higher than 60 Hz, which is generally known as the critical flicker frequency. As the ON time prolongs within the 16.667 msec, the human eye feels brighter. As the ON time shortens, the eye feels darker. The human eye perceives 128 ON/OFF time combinations as 128 gray levels. Light is projected onto the screen such that the light valve is turned ON or OFF for each pixel, and an R image that visually has gray levels is reproduced. With respect to each of G and B, 128 gray levels are reproduced in the same way as in the case of R.

Each image of R, G, and B is projected in turn onto the screen for one third of 1 frame time of about 16.667 msec, i.e., about 5.556 msec. As mentioned above, the human eye does snot respond to flickers higher than the critical fusion frequency of 60 Hz and so he or she feels as if three colors were displayed simultaneously. Consequently, a color image is visually reproduced.

In the example given above, gray levels corresponding to 7 bits, i.e., 128 gray levels ($2^7$ gray levels), are represented. The light valve 103 is switched ON and OFF at intervals of about 0.038 msec, i.e., the time (about 4.862 msec) for which light is made to shine on the color filter Cr divided by 127 (128−1) that is the number of gray levels excluding the zeroth gray level at which light is not output.

Where it is attempted to display a wider range of gray scale with the above-described structure, e.g., gray levels ($2^8$=256 gray levels) corresponding to 8 bits, it is necessary to switch ON and OFF the light valve 103 at intervals within the time for which light is made to shine on the color filter Cr divided by 255, i.e., about 0.019 msec, if the principle described above is applied.

Where the light is turned ON and OFF using the light valve 103 such as a DMD as mentioned above, however, the minimum switching time achievable with the presently available DMD is about 0.030 msec. Therefore, it is impossible to switch the device ON and OFF at intervals of about 0.019 msec as described above.

Where the light is turned ON and OFF using the light valve 103 as consisting of a DMD in an attempt to solve the above-described problem, the minimum switching time is about 0.030 msec as described above. A structure capable of displaying 1024 gray levels ($2^{10}$ gray levels) with this structure is disclosed, for example, in Japanese Unexamined Patent Publication No. 149350/1997.

This disclosed display device is shown in FIG. 2. Note that like components are indicated by like reference numerals in various figures and those components which have been already described in connection with FIG. 1 will not be described below. A color wheel 202 is divided into 6 segments to form color filters Crd, Cgd, and Cbd of lower transmissivity than color filters Cr, Cg, and Cb, in addition to the conventional filters Cr, Cg, and Cb. The transmissivity of the filters Crd, Cgd, and Cbd is one eighth of that of the filters Cr, Cg, and Cb. Thus, gray levels corresponding to the 3 bits, i.e., $2^3$ gray levels (8 gray levels), are added.

The structure shown in FIG. 2 and its operation are now described. Drive electronics 205 receive 10-bit color image data having a frame rate of 60 Hz and a synchronizing signal. The drive electronics 205 create control signals for a color wheel 202 and for a light valve 103 from the input color image data and send these control signals to the wheel and to the light valve.

Of the 6 segments on the color wheel 202, the color filters Cr and Crd transmit R. The color fitters Cg and Cgd transmit G. The color filters Cb and Cbd transmit B. The transmissivity of the filter Crd is one eighth of that of the filter Cr. The transmissivity of the color filter Cgd is one eighth of that of the filter Cg. The transmissivity of the color filter Cbd is one eighth of that of the filter Cb.

The color wheel 202 makes one revolution in ⅙0msec≅16.667 msec. This rotation is synchronized to the frame rate of the displayed image. In the structure shown in FIG. 2, there are 6 color filters and so there exist 6 boundaries as can be seen from the figure. In this case, therefore, the ineffective time is about 15°×6/360°×16.667 msec ≅4.167 msec. The effective time is about 16.667 msec−4.167 msec=12.500 msec.

The time for which the light from the light source 101 is made to shine on the color filter Cr of the color wheel 202 during one revolution of the color wheel 202 is one third of the aforementioned effective time (12.500 msec) multiplied by a proportion at which light is made to shine on the color filter Cr, i e., about 12.500 msec/3×127/(127+7)=3.949 msec. The segment of the color filter Cr is determined based on this time. Similarly, the time for which light is made to hit the color filters Cg and Cb is also about 3.949 msec.

The time assigned to illuminate the color filter Crd is one third of the effective time (12.500 msec) multiplied by the proportion at which the filter Crd is illuminated, i.e., about 12.500 msec/3×7/(127+7)=0.218 msec. The segment of the color filter Crd is determined based on this time. Similarly, the time for which the color filters Cgd and Cbd are illuminated is about 0.218 msec.

A method of reproducing gray levels is now described, taking R as an example; The time for which the color filter Cr of the color wheel 202 is illuminated is controlled according to R color image data. Where the first gray scale of the R image signal represented by the filter Cr is displayed, the light valve 103 is turned ON for about 0.031 msec (=3.949 msec/127) of the time for which the filter Cr is illuminated during one revolution of the color wheel 202. The valve 103 is kept OFF during the remaining time.

Where the second gray level represented by the color filter Cr is displayed, the light valve 103 is maintained ON during twice of the ON time for the first gray level represented by the filter Cr, i.e., about 0.062 msec. The valve is kept OFF during the remaining time. Where the third, the fourth, . . . , and the 127th gray levels are displayed, the light valve is turned ON for 3 times, 4 times, . . . , 127 times, respectively, of the ON time for the first gray level. The light valve is kept OFF during the remaining times. Thus, there are 128 combinations of ON/OFF times and thus 128 gray levels can be represented.

A method of displaying 1024 R gray levels using the color filter Crd is now described. Where the first gray level represented by the filter Crd is displayed, the light valve 103 is kept ON for about 0.031 msec (=0.218 msec/7) within the time for which the filter Crd is illuminated during one revolution of the color wheel 202. The valve is kept OFF during the remaining time. Where the second gray-level represented by the filter Crd is displayed, the valve is kept ON for twice of the ON time for the first gray-level represented by the filter Crd, i.e., 0.062 msec. The valve is kept OFF during the remaining time. Where the third, fourth, . . . , and 7th gray levels represented by the filter Crd are displayed, the light valve is kept ON for 3 times, 4 times, . . . , 7 times, respectively, of the ON time for the first gray level represented by the filter Crd. The light valve is kept OFF during the remaining time. Thus, there are 8 combinations of ON/OFF times including a fully OFF state and thus 8 gray levels can be represented.

The transmissivity of the color filter Crd is one eighth of that of the filter Cr. The brightness of the first gray level displayed using only the color filter Crd is one eighth of that of the first gray level displayed using only the filter Cr. That is, using combinations of the color filters Cr and Crd, 128 gray levels (provided by the color filter Cr)×8 gray levels (provided by the color filter Crd)=1024 gray levels ($2^{10}$ gray levels) can be represented.

Accordingly, of color image data (R image data in this example) quantized with 10 bits ($2^{10}$), the upper-order 7 bits are expressed using the color filter Cr, while the lower-order 3 bits are expressed using the color filter Crd. In this way, 1024 gray levels can be reproduced.

With respect to G and B, the upper-order 7 bits are expressed using the color filters Cg and Cb. The lower-order 3 bits are represented using the color filters Cgd and Cbd. In this manner, 1024 gray levels can be reproduced. Images of R, G, and B are projected onto the screen 104 by this gray scale control. A color image is perceived by the human visual characteristics.

Where 1024 gray levels are expressed using the structure and procedure described above, the light-transmitting region of the color wheel 202 is divided into 6 segments corresponding to the different colors and different gray levels. Therefore, there are 6 boundaries between the color filters. The ineffective time due to the boundaries is doubled compared with the case in which there are only three boundaries between color filters. Finally, the brightness of the image projected onto the screen is decreased by about 14%.

In addition to this decrease in the brightness, the presence of the color filters Crd, Cgd, and Cbd having a transmissivity that is only one eighth of that of the color filters Cr, Cg, and Cb lowers the brightness.

SUMMARY OF THE INVENTION

In view of the foregoing problems, the present invention has been made.

It is an object of the present invention to provide a display device which is capable of representing gray levels more than the number of gray levels limited by the minimum switching time at which a light valve is turned ON and OFF and which suffers almost no brightness decrease.

A display device in accordance with the present invention acts to display an image according to input image data and comprises a light source, light-transmitting filters for separating the light from the light source into at least four kinds of light including white light, and a light valve for projecting each kind of light transmitted through the filters onto a screen.

Some gray levels have been heretofore impossible to display due to restrictions imposed by the minimum switching time at which the light valve is turned ON and OFF. Information about only visually sensitive brightness levels is reproduced using the light-transmitting filter corresponding to white light. Hence, smoother gray-scale representation can be accomplished without deteriorating the brightness.

DETAILED DESCRIPTION OF THE INVENTION

First Embodiment

Figure 1:
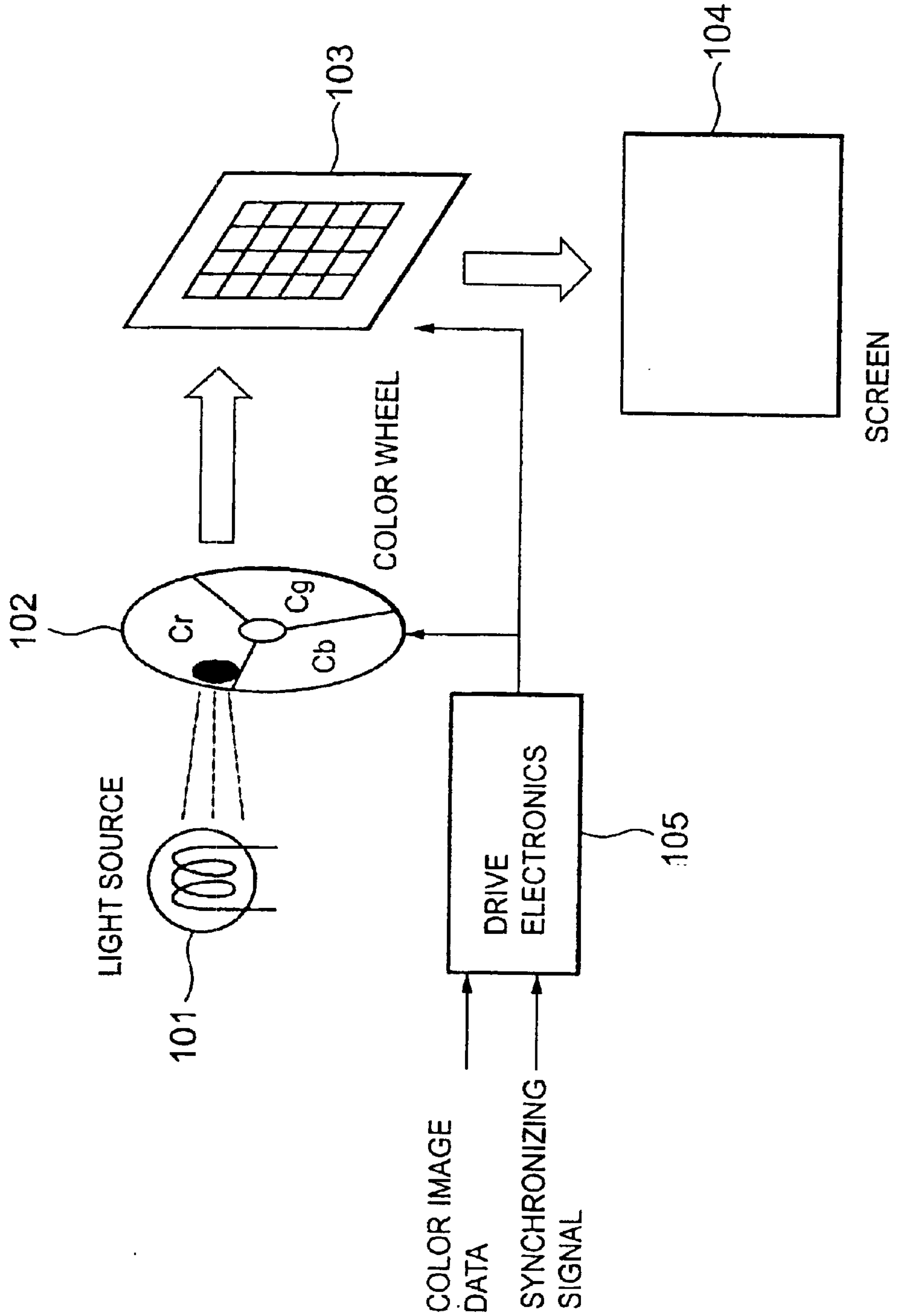
Fig.1 PRIOR ART
FIG. 1 is a block diagram of the prior art display device.
Figure 2:
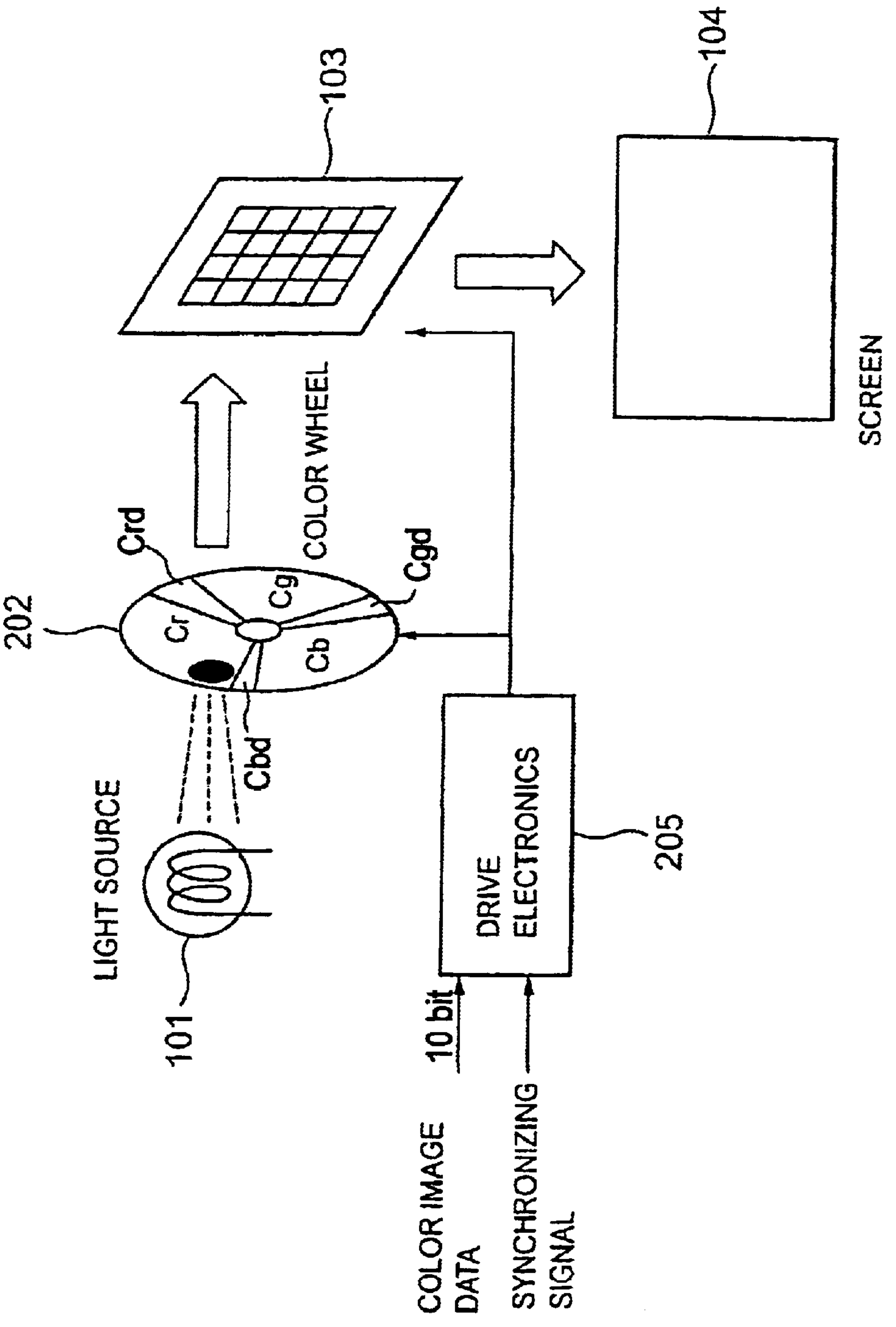
Fig.2 PRIOR ART
FIG. 2 is a block diagram of a known display device disclosed in Japanese Unexamined Patent Publication No. 149350/1997.
Figure 3:
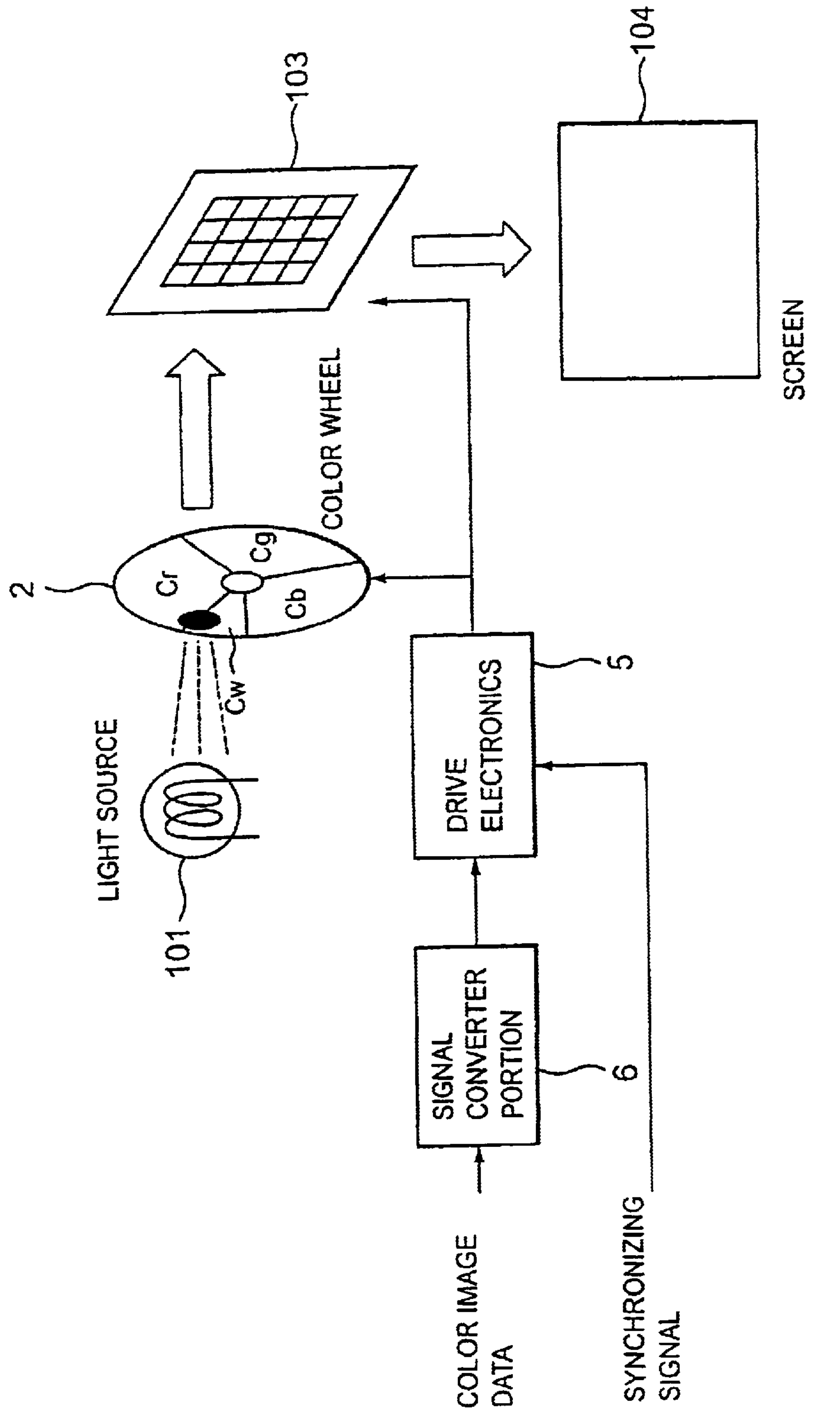
FIG. 3 is a block diagram of a display device in accordance with the present invention.

Referring to FIG. 3, there is shown a block diagram of a display device in accordance with the present invention. This display device comprises a light source 101, a color wheel 2, a light valve 103, a screen 104, a signal converter portion 6, and drive electronics 5.

As shown in FIG. 3, the color wheel 2 is divided into 4 segments including color filters Cr, Cg and Cb that transmit R, G, and B, respectively. The color wheel 2 further includes a color filter Cw such as a neutral density filter that transmits white light. This filter Cw shows almost flat spectral characteristics, as opposed to the filters Cr, Cg, and Cb. Let the color filters Cr, Cg, Cb, and Cw have transmissivities of fr(λ), fg(λ), fb(λ), and fw(λ), respectively fw(λ) is so set as to satisfy Eq. (1) below:

$$\int_{380}^{780} fw(\lambda)\cdot V(\lambda)\,d\lambda = \frac{1}{8}\cdot\int_{380}^{780}\{fr(\lambda)+fg(\lambda)+fb(\lambda)\}V(\lambda)\,d\lambda \tag{1}$$

where (λ) is the wavelength of light, V(λ) is the relative spectral sensitivity characteristic of the human eye, and 1/K is a coefficient determining the transmissivity of Cw.

If the coefficient K at the right side of Eq. (1) above is set to 8 (K=8), the color filters Cw, Cr, Cg, and Cb assume such transmissivities that the brightness of the first gray level represented using only the color filter Cw is one eighth of the brightness achieved when the three filters Cr, Cg, and Cb simultaneously represent their first gray levels. That is, the integrated value of the transmissivity in the visible range (light wavelength λ lies between 380 nm and 780 nm) of the light-transmitting filter (color filter Cw) corresponding to white light is smaller than the integrated values of the transmissivities in the visible range of the other light-transmitting filters Cr, Cg, and Cb.

As mentioned above, where a light valve such as a DMD is used, if the minimum switching time is 0.030 ms, it is difficult to achieve 256 gray levels. Therefore, 1/K is set to $\frac{1}{2^P}$ (where P is a natural number), i.e., ½, ¼, ⅛, 1/16, and so forth. However, where K has a small value, the minimum switching time of the light valve poses a constraint. Where K has a large value, the segment Cw widens and thus the color filters, Cr, Cg, and Cb become narrowed. This will narrow the full range of gray scale in representing R, G, and B colors. Of these limiting conditions, K=8 is selected because it is well applied to a display device. This case is discussed below.

The display device in accordance with the present embodiment constructed in this way decomposes light into 4 colors by the color filters Cr, Cg, Cb, and Cw. The 4 colors of light are projected via, the light valve 103 onto the screen 104, thus reproducing a color image.

The operation of the display device shown in FIG. 3 is next described. Color image data of 10 bits having a frame rate of 60 Hz is input to the signal converter portion 6. This converter portion 6 converts the input color image data as follows and sends it to the drive electronics 5. The drive electronics 5 also receive a synchronizing signal.

Figure 4:
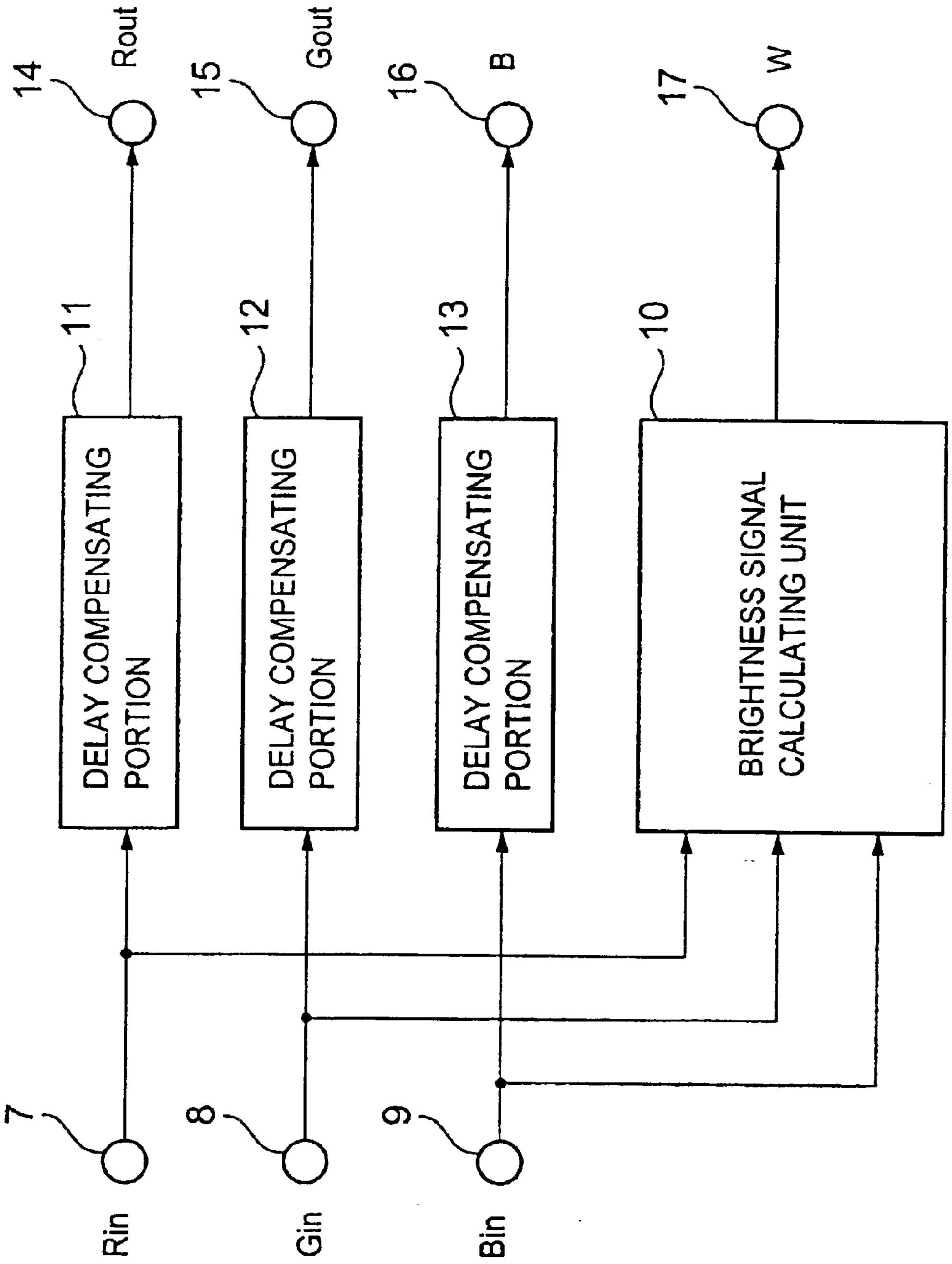
FIG. 4 is a block diagram of a signal converter portion in a display device in accordance with the invention.
Figure 5A:
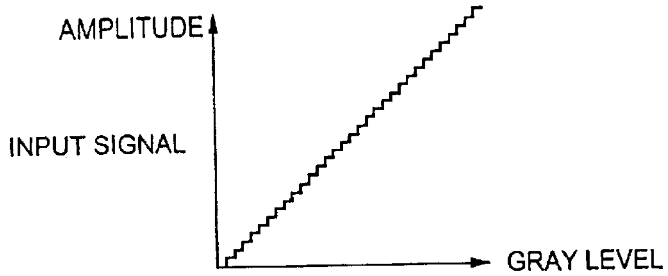
FIG. 5 is a graph illustrating a method of displaying gray levels with a display device in accordance with the invention.
Figure 5B:
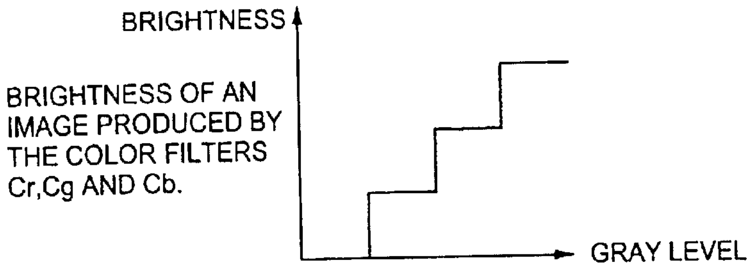
Figure 5C:
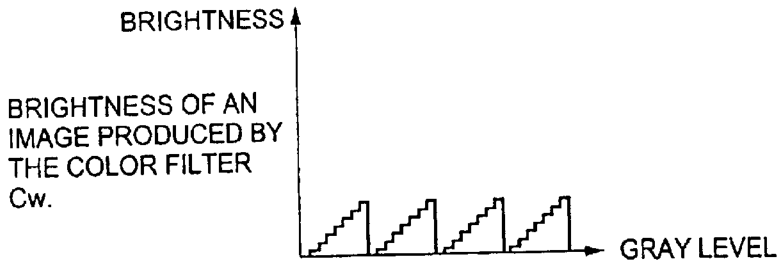
Figure 5D:
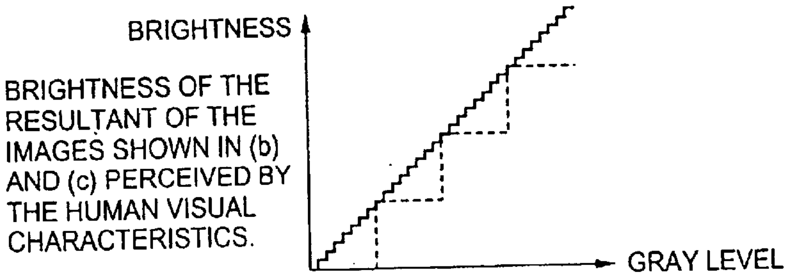
Figure 6A:
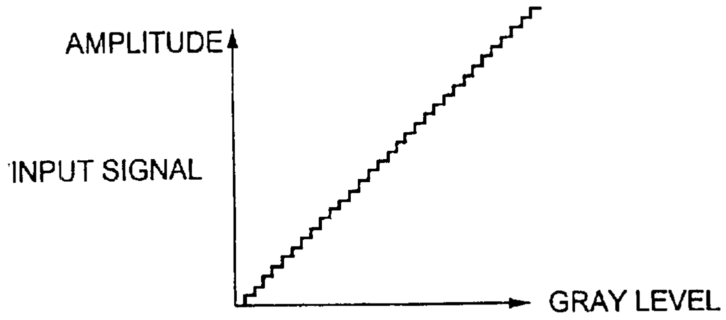
FIG. 6 is a graph illustrating another method of displaying gray levels with a display device in accordance with the invention.
Figure 6B:
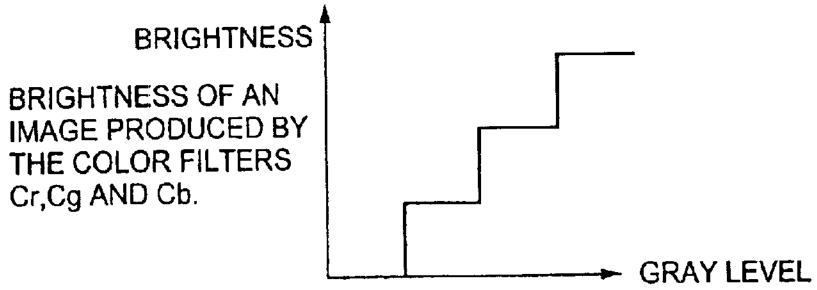
Figure 6C:
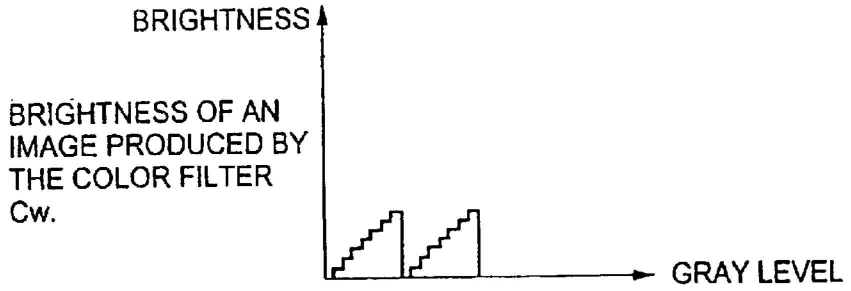
Figure 6D:
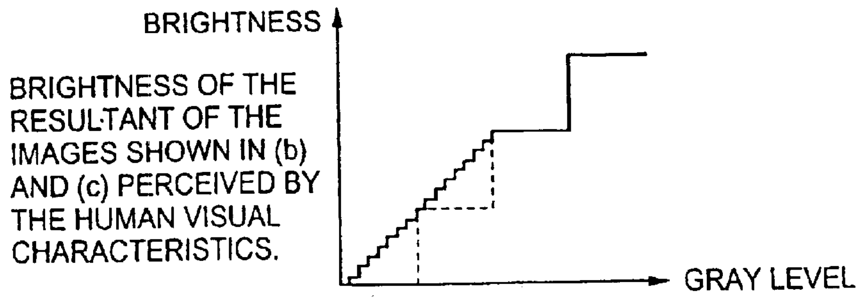

The manner in which the signal converter portion 6 converts its input color image data is now described by referring to FIG. 4, which is a detail block diagram of the signal converter portion 6. This converter portion 6 has input terminals 7, 8, and 9 receiving 10-bit, color image data Rin, Gin, and Bin, respectively, corresponding to the R, G, and B colors.

The signal converter portion 6 further includes a brightness signal calculating unit 10 for calculating brightness data Y satisfying Eq. (2) below, assuming that the lower-order 3 bits of the input color image data Rin, Gin, and Bin are Sr, Sg, and Sb, respectively. The upper-order 3 bits of the brightness data Y is supplied as a converted color image data Wout to an output terminal 17. Delay compensating portions 11, 12, and 13 delay the upper-order 7 bits of the signals Rin, Gin, and Bin coming from the input terminals 7, 8, and 9 by an amount equal to the time taken for the signal calculating unit 10 to calculate the brightness signal. The obtained data are sent as converted image data Rout, Gout, and Bout to output terminals 14, 1.5, and 16, at the timing of the data Wout.

$$Y=0.299Sr+0.587Sg+0.114Sb \quad (2)$$

The out-put terminals 14, 15, 16, and 17 are connected with the drive electronics 5, which in turn create control signals for the color wheel 2 and light valve 103 from the converted color image data Rout, Gout, Bout,Wout and from the synchronizing signal and send the control signals to the color wheel 2 and to the light valve 103.

The color wheel 2 makes one revolution in 1/60sec≅16.667 msec (3600 rpm). This rotation is synchronized with the frame rate of the displayed image. The color wheel 2 has 4 color filters that form four boundaries as can be seen from the figure. In this case, therefore, the ineffective time is about 15°×4/36°×16.667 msec≅2.778 msec. The effective time is about 16.667 msec−2.778 msec=13.889 msec.

During one revolution of the color wheel 2, the time assigned to illuminate the color filter Cr of the color wheel 2 with the light from the light source 101 is 4.546 msec, for the following reason. The three segments Cr, Cg, and Cb produce 128 gray levels. One segment Cw produces 8 gray levels. The effective time of about 13.889 msec corresponds to these three segments Cr, Cg, Cb and one segment Cw. Since the color filter Cr produces 128 gray levels, the ratio of the time assigned to the color filter Cr to the effective time of about 13.889 msec is found by calculating (the time for which the color filter Cr is illuminated) divided by (the time for which the color filter Cr is illuminated×the time for the 3 segments+the time for which the color filter Cw is illuminated). That is, the time assigned to the color filter Cr is about 13.889 msec×127/(3×127+7)=4.546 msec. The segment Cr is determined based on this time of 4.546 msec. Similarly, the color filters Cg and Cb are illuminated for 4.546 msec.

The time assigned to illuminate the color filter Cw is discussed. The effective time of about 13.889 msec corresponds to 3 segments Cr, Cg, and Cb producing 128 gray levels and 1 segment Cw producing 8 gray levels. Since the segment of the color filter Cw produces 8 gray levels, the ratio of the time assigned to the color filter Cw to the effective time is found by calculating (the time for which the color filter Cw is illuminated) divided by (the time for which the color filter Cr is illuminated×the time for the 3 segments+the time for which the color filter Cw is illuminated). That is, about 13.889 msec×7/(3×127+7)=0.251 msec is the time assigned to the color filter Cw. The segment of the color filter Cw is determined based on this time.

A method of reproducing gray scales of R is now described. The light valve 103 is controlled according to the converted color image data Rout about R produced from the output terminal 14 of the signal converter portion 6 while the color filter Cr is being illuminated. Where the first gray level of the converted color image data Rout about R is displayed, the light valve 103 is kept ON during about 0.036 msec (4.546 msec/177 gray levels) within the time for which the color filter Cr is illuminated during one revolution of the color wheel 2. The valve 103 is kept OFF during the remaining time. Where the second gray level is displayed, the valve 103 is kept ON during twice of the time for the first gray level (i.e., 0.072 msec). The valve 103 is kept OFF during the remaining time. Where the third, fourth, . . . , and 127th gray levels are displayed using the Rout, the light valve 103 is kept ON for 3 times, 4 times, . . . , 127 times, respectively, of the ON time for the first gray level of the Rout. The valve 103 is kept OFF during the remaining time. Thus, there are 128 combinations of ON/OFF times including a fully OFF state.

As mentioned above, the human eye does not respond to flickers higher than the critical fusion frequency of 60 Hz and so he or she feels brighter with increasing the ON time within the period of 16.667 msec and feels darker with decreasing the ON time. The human eye perceives the 128 combinations of ON/OFF times as 128 gray levels. In exactly the same way, 128 gray levels are reproduced from G and B.

Now, a method of reproducing gray scales of 129 and more using the color filter Cw is described. Of the color image data Rin, Gin, and Bin quantized with 10 bits, the upper-order 7 bits are displayed using the capability of the color filters Cr, Cg, and Cb to reproduce 128 gray levels. Of the color image data Rin, Gin, and Bin quantized with 10 bits, the lower-order 3 bits are displayed as 3-bit color image data Wout (having $2^3$ gray levels=8 gray levels) using the color filter Cw.

Where the first gray level of the 3-bit color image data Wout is displayed, the light valve. 103 is kept ON for 0.036 msec (=0.251 msec/7) within the time for which the color filter Cw is illuminated during one revolution of the color wheel 2. The valve 103 is kept OFF during the remaining time. Where the second gray level of Wout is displayed, the valve 103 is kept ON during twice of the ON time for the first gray level, i.e., 0.072 msec. The valve 103 is kept OFF during the remaining time. Where the third, fourth, . . . , and seventh gray levels are displayed, the light valve 103 is kept ON during three times, four times, . . . , and 7 times, respectively, of the time for the first gray level represented by Wout. The valve 103 is kept OFF during the remaining time. In this way, 8 gray levels including a fully OFF state can be represented.

With respect to the transmissivity of the color filter Cw, it is now assumed that K=8, which is substituted into Eq. (1). In this case, the brightness of the first gray level of Wout represented using only the color filter Cw is one eighth of the brightness obtained where the three color filters Cr, Cg, and Cb simultaneously provide their respective first gray levels. Therefore, where the display image is a black-and-white image, the upper-order 7 bits-of the image data quantized with 10 bits can represent $2^7$ gray levels=128 gray levels using the color filters Cr, Cg, and Cb. The lower-order 3 bits can represent $2^3$ gray levels=8 gray levels using the color filter Cw. Consequently, 1024 gray levels can be represented.

This is described in detail by referring to FIGS. 5(*a*)–5(*d*). FIG. 5(*a*) shows a signal applied to the signal converter portion 6. FIG. 5(*b*) shows the brightness of an image reproduced by the color filters Cr, Cg, and Cb. FIG. 5(*c*) shows the brightness of an image reproduced by the color filter Cw. FIG. 5(*d*) shows the brightness of the resultant of the images shown in FIGS. 5(*b*) and 5(*c*) perceived by the human visual characteristics. It can be observed that the number of gray levels shown in FIG. 5(*d*) is the same as the number of gray levels shown in FIG. 5(*a*).

Where the displayed image is not a black-and-white image but a color image, the brightness components of the color image data quantized with 10 bits can produce 1024 gray levels using the color filters Cr, Cg, Cb, and Cw. However, with respect to color components, only 128 gray levels can be produced using the color filters Cr, Cg, and Cb. Furthermore, the chroma deteriorates slightly, because white and black components are mixed by the color filter Cw.

However, the visual characteristics of the human eye have such a feature that the eye can discriminate a less number of color gray levels than brightness gray levels. Consequently, this will not present great problems in practical situations.

The addition of only the color filter Cw to the three color filters Cr, Cg, and Cb described above can increase the number of gray levels of brightness. Therefore, the decrease in the brightness is only about 3%, compared with the instrument comprising the three color filters. As a result, the effects of the decrease in the brightness present almost no problems.

The color filter Cw is only required to exhibit almost flat spectral transmission characteristics in the visible range. This filter is not limited to a filter that transmits pure white light. For example, to adjust the color temperature of the reproduced image, the spectral characteristics are allowed to be shifted slightly toward red or blue.

Second Embodiment

In the first embodiment, the color filter Cw is used from the first to the 1024th gray level. It is not necessary to use the color filter Cw for all the gray levels. The filter Cw may be employed only for dark image portions. An example of operation in this case is next described by referring to FIGS. 6(*a*)–6(*d*). FIG. 6(*a*) shows an image signal applied to the signal converter portion 6. FIG. 6(*b*) shows the brightness of an image reproduced by the color filters Cr, Cg, and Cb, and is the same as obtained in the first embodiment. FIG. 6(*c*) shows the brightness of an image reproduced by the color filter Cw. This filter Cw is used for only the 15th gray level and below. The filter Cw is kept OFF in response to the 16th gray level and above. The resultant brightness of the color filters Cr, Cg, Cb, and Cw is shown in FIG. 6(*d*).

The human eye's capability to discriminate bright portions is lower than the human eye's capability to discriminate dark portions. Therefore, where the color filter Cw is used only for dark portions to resolve gray levels, the same advantages can be obtained as the first embodiment. Furthermore, the 16th and higher gray levels can be displayed in the same way as the prior art instrument. The decrease in the chroma due to mixing of white and black components by the color filter Cw can be suppressed to a minimum.

Third Embodiment

In the first and second embodiments, 10 bits of image data are separated into the upper-order 7 bits and the lower-order 3 bits and displayed. The present invention is not limited to this separation method. For example, (n+m)-bit image data (where n and m are any arbitrary numbers equal to or greater than 0) may be divided into the upper-order n bits and the lower-order m bits and displayed. It is only necessary that the upper-order n bits and the lower-order m bits suitable for the characteristics of the display device be established.

Fourth Embodiment

In the first through third embodiments, Eq. (2) is used to calculate brightness data Y. The invention is not restricted to the use of this equation. Rather, appropriate coefficients may be used according to the spectral characteristics of the color filters Cr, Cg, Cb, and Cw. Furthermore, coefficients assigned to the filters Sr, Sg, and Sb may be appropriately varied to reduce the size of the hardware.

Where signals are transmitted such that a Y signal (luminance signal) and a chrominance signal are combined as in normal TV, only the Y signal may be used, though the chrominance signal is also transmitted.

Fifth Embodiment

In the first through fourth embodiments, a color filter exhibiting flat spectral characteristics in the visible range is used as the color filter Cw. The invention is not limited to the use of this filter. Rather, the filter may have any desired characteristics as long as it transmits white light within a realizable range. For instance, the characteristic curve may have some peaks and valleys. Filters having these characteristics may have advantages similar to those yielded by the aforementioned filters.

In the descriptions provided thus far, color filters corresponding to Y (yellow), M (magenta), and C (cyan) may be formed on the color wheel, in addition to R, G, and B. The color filters are not always restricted to R, G, and B color filters.

The invention may be embodied in other specific forms without departing from the spirit or essential parts thereof. The above embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A display device for displaying an image according to input image data that is digital data, said display device comprising:

a light source for producing light;

light-transmitting filters for separating the light from said light source into at least four kinds of light including white light, said light-transmitting filters including a white-transmitting filter for transmitting white light and non-white transmitting filters;

a light valve for projecting each kind of light from said light-transmitting filters onto a screen;

said white light-transmitting filter being used to display information corresponding to lower-order bits of said digital data;

a signal converter portion to control said white light-transmitting filter using a control signal corresponding to said lower-order bits, said signal converter portion including input terminals for receiving non-white light signals and a brightness signal calculating unit for calculating the brightness of the non-white light signals;

said non-white light-transmitting filters being used to display information corresponding to said higher-order bits of said digital data;

a drive device directly coupled to said signal converter portion for creating control signals for controlling the light transmitting filters and light valve; and an integrated value of a transmissivity in a visible range of said white-transmitting filter is smaller than the combined integrated values of transmissivities in a visible range of said non-white transmitting filters;

wherein brightness created by a first gray level represented via said white light-transmitting filter is $\frac{1}{2}^{m}$ (m is the number of lower-order bits) the brightness created by a first gray level represented via said non-white light-transmitting filters.

2. The display device of claim 1, wherein said white light-transmitting filter has spectral characteristics that are almost flat in the visible range of wavelengths of the light.

3. The display device of claim 1, wherein if a brightness required by the input image data is lower than a given gray level, information is displayed using said white light-transmitting filter or said non-white light-transmitting filters, and if said brightness is higher than said given gray level, information is displayed using only said non-white light-transmitting filters.

4. The display device of claim 1, wherein said light valve is of the reflective type.

5. The display device of claim 1, wherein said light valve is of the transmissive type.

6. The display device of claim 1, wherein a value obtained by integrating the product of spectral transmission factor of said white light-transmitting filter in the visible range and spectral luminous efficiency with respect to wavelength is less than sum of values obtained by integrating the product of spectral transmission factor of each of said non-white light-transmitting filters in the visible range and spectral luminous efficiency with respect to wavelength.

7. The display device of claim 1, wherein said signal converter portion controls said non-white light-transmitting filters using another control signal corresponding to said higher-order bits.

8. A method for displaying digital image data from a display device, comprising:

decomposing light from a light source into a plurality of colors, one of said plurality of colors being white;

controlling a white-light transmitting filter of a set of filters with a control signal corresponding to lower-order bits of said digital image data generated by a signal converter portion, wherein said signal converter portion includes input terminals for receiving non-white light signals and a brightness signal calculating unit for calculating the brightness of the non-white light signals;

controlling, by a drive device directly coupled to said signal converter portion, the light transmitting filters and a light valve used to project light from the set of filters;

displaying information corresponding to said lower-order bits using said white-light transmitting filters; and projecting said plurality of colors from said set of filters;

wherein an integrated value of a transmissivity in a visible range of said white-light transmitting filter is smaller than the combined integrated values of transmissivities in a visible range of the other filters in said set of filters;

wherein brightness created by a first gray level represented via said white light-transmitting filter is $\frac{1}{2}^m$ (m is the number of lower-order bits) the brightness created by a first gray level represented via said non-white light-transmitting filters.

9. The method of claim 8, further comprising displaying information corresponding to higher-order bits of said digital image data.

10. The method of claim 9, further comprising controlling non-white transmitting filters of said set of filters with another control signal corresponding to said higher-order bits of said digital image.

* * * * *